Oct. 12, 1965 W. R. SPENCER 3,211,004
PRESSURE SENSITIVE APPARATUS
Filed Jan. 4, 1962

INVENTOR.
WILLIAM R. SPENCER
BY Richard E. Hosley
HIS ATTORNEY

United States Patent Office 3,211,004
Patented Oct. 12, 1965

3,211,004
PRESSURE SENSITIVE APPARATUS
William R. Spencer, Cincinnati, Ohio, assignor to General Electric Company, a corporation of New York
Filed Jan. 4, 1962, Ser. No. 164,324
5 Claims. (Cl. 73—398)

This invention relates to pressure sensitive apparatus and more particularly to pressure sensitive apparatus which responds to a fluid pressure condition and produces an output signal variable in accordance with the pressure condition sensed. Such devices may be used for pressure indication, control, or both.

Pressure sensitive apparatus of the general type here involved usually consists of one or more expansible devices such as flexible bellows moving in response to pressure changes to actuate indicators or transducers and thereby produce indication or control signals. Such devices tend to be relatively delicate and are adversely affected by shock and vibration. For this reason difficulty has been encountered in using such devices where vibration and shock conditions are extreme and where accuracy and reliability are important, such as, for example, use on aircraft jet engines for measuring pressure conditions in the engine.

It is, accordingly, an object of the present invention to provide pressure sensitive apparatus which is extremely rugged and resistant to shock and vibration so as to be suitable for use under extreme environmental conditions such as are encountered in measurement of pressure conditions in jet engines.

Another object of the invention is to provide pressure sensitive apparatus which is easy to calibrate and which gives consistent and reliable results when calibrated and put into operation.

A further object of the invention is to provide pressure measuring apparatus which is relatively simple, inexpensive, and easy to manufacture.

Further objects and advantages of the invention will become apparent as the following description proceeds.

Briefly, in accordance with the invention, extremely rugged pressure sensitive apparatus is obtained by the use of a rigid rocker arm secured to a base member through an elastically deformable torsion bar. Expansible pressure devices press against opposite ends of the rocker arm to cause rotation thereof in response to pressure changes. The rotation is permitted by elastic deformation of the torsion bar, which acts as both a support and a pivot for the rocker arm. The relatively small angular movement of the rocker arm is translated into an electrical signal by use of an E-core differential transformer which gives a high gain and linear electrical output suitable for indication or control purposes.

For a better understanding of the invention, reference should be made to the following description taken in connection with the accompanying drawings in which.

Figure 1:
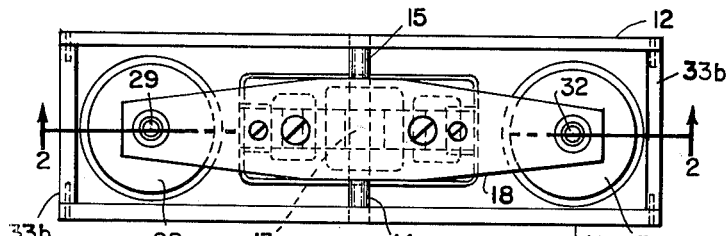
FIG. 1 is a plan view of pressure sensitive apparatus constructed in accordance with the present invention.

Referring now to the drawings, there is illustrated one form of pressure sensitive apparatus constructed in accordance with the present invention. As shown, the apparatus comprises a base member 10 to which are rigidly attached upstanding side support members 11 and 12. Extending between the side support members is a torsion bar 13 in the form of an elastically deformable metallic rod. The bar 13 has outwardly extending spring portions 14 and 15 extending in the direction of the axis of the torsion bar which may be called the twist axis and terminating in end portions 16 and 17 which are rigidly secured, as by welding, to the side support members 11 and 12. The central portion of the torsion bar 13 extends through and is rigidly attached, as by welding, to the center of rocker arm 18 which extends in a direction perpendicular to the axis of the torsion bar in the direction of the longitudinal axis thereof which intersects the torsion bar axis. Thus, it will be noted that the torsion bar acts both as a support and a central pivot for rotating movements of the rocker arm 18 about the axis of the torsion bar.

Disposed beneath the outer ends of the rocker arm 18 and extending vertically with respect to the base member 10 is a pair of expansible devices illustrated in the preferred embodiment of the invention as a vacuum bellows 19 and a pressure bellows 20. The lower end of bellows 19 is provided with an annular flanged member 21 which is received in an aperture 22 in base member 10. The flanged member 21 is provided with a threaded opening which, in the illustrated device, is closed with a plug 23 so as to maintain the vacuum in bellows 19.

The lower end of pressure bellows 20 is provided with an annular flanged member 24 which is received in an aperture 25 in base member 10. The flanged member 24 is provided with a threaded opening closed by a threaded nipple 26 extending from one end of a fluid conduit 27. The fluid conduit 27 is connected to a source of fluid pressure (not shown) to be measured such as, for example, the combustion chamber of a jet engine.

The upper end of vacuum bellows 19 is hermetically sealed by a plate 28 having an upstanding threaded stud 29 extending through an opening in the left-hand end of rocker arm 18 and secured thereto in a suitable manner as by nuts 30. Similarly, the upper end of pressure bellows 20 is hermetically sealed by a plate 31 having an upstanding threaded stud 32 extending through an opening in the right-hand end of rocker arm 18 and secured thereto in a suitable manner as by nuts 33.

The entire device is preferably completely enclosed, and for this purpose there is shown a cover member 33a and end plates 33b extending between and fastened to, in a suitable manner, as by screws (not shown), the side members 11 and 12. For some applications the casing may be made fluid tight and filled with a suitable vibration damping liquid such as silicone oil.

Figures 2, 3:
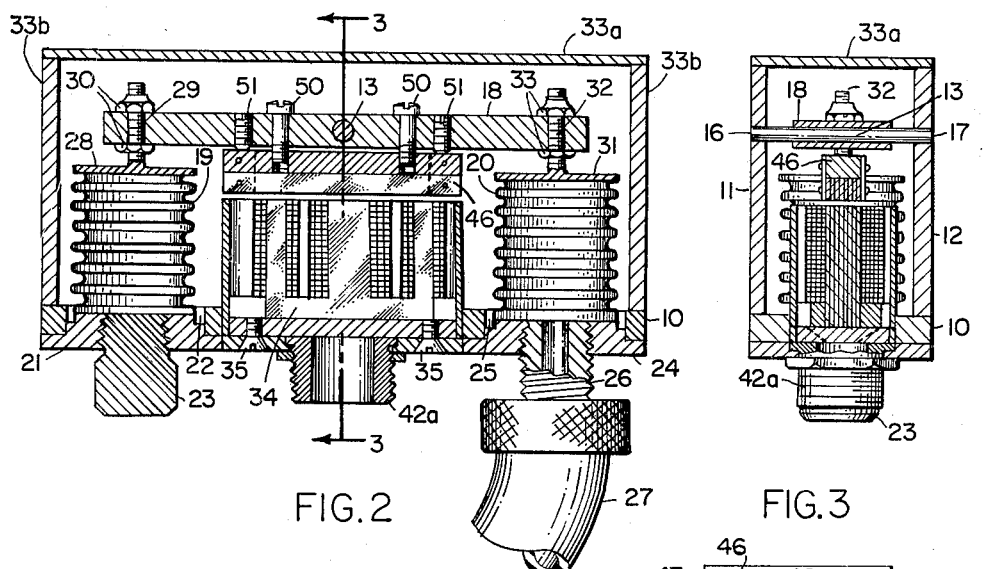
FIG. 2 is a sectional side elevation view of the apparatus shown in FIG. 1 taken along the section line 2—2 of FIG. 1.
FIG. 3 is a side sectional view of the apparatus shown in FIG. 2 taken along the section line 3—3 of FIG. 2.

When the pressures in both bellows 19 and 20 are equal, the rocker arm 18 occupies a horizontal position shown in FIG. 2 of the drawing. When the fluid pressure in conduit 27 and the connected bellows 20 increases, the bellows 20 expands upwardly causing the rocker arm 18 to rotate and the torsion bar 13 to twist counterclockwise as viewed in FIG. 2. This rotating action is permitted by the elastic deformation of the spring portions 14 and 15 of torsion bar 13. Since the vacuum bellows 19 acts as a reference pressure, the degree of rotation of rocker arm 18 becomes a measure of absolute pressure in fluid conduit 27.

The position of the rotating rocker arm 18 relative to the stationary base member 10 is translated into an electric signal voltage by means of a suitable transducer. The E-core differential transformer type of transducer illustrated is particularly well suited for this purpose because it produces adequate change in signal voltage with a relatively small movement of the armature, such as is experienced by the rocker arm 18. Such rotating movement may, for example, be only a degree or two over a pressure range of 0–600 p.s.i.a.

Figure 4:
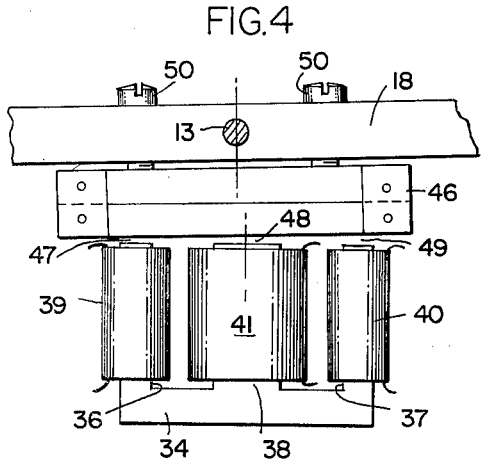
FIG. 4 is a partial view of the apparatus of FIGS. 1, 2, and 3 showing certain constructional details.
Figure 5:
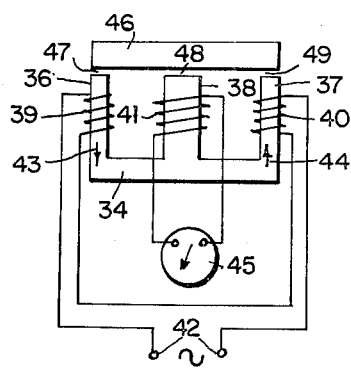
FIG. 5 is a circuit diagram showing electrical connections of the E-core differential transformer forming a part of the apparatus shown in the other figures of the drawing.

As best shown in FIGS. 2, 3 and 4 of the drawing, the transducer comprises an E-shaped magnetic core member 34 mounted on base member 10 by means of screws 35. The core has three upstanding legs 36, 37, and 38, the outer legs 36 and 37 carrying primary windings 39 and 40 and the center leg 38 carrying a secondary winding 41. The primary windings are connected in series opposition to alternating current supply terminals 42 so that when energized they produce alternating magnetic flux in opposite directions in legs 36 and 37 as indicated by the arrows 43 and 44. The secondary winding 41 is connected to energize a suitable indicating instrument such as an A.C. voltmeter 45 which may be calibrated to read pressure in pounds per square inch absolute. The electrical connections for the transducer windings may be conveniently brought out of the pressure sensitive apparatus casing through an opening in the threaded flange 42a extending downwardly through a central opening in the base member 10.

The transducer also has a movable magnetic armature 46 adjacent to and spaced from the outer extremities of core legs 36, 37, and 38 to form variable air gaps 47, 48, and 49. The armature 46 is connected to rotate with the rocker arm 18 by means of adjusting screws 50 extending downwardly through the openings in the rocker arm into threaded holes in the top of the armature. By adjustment of both screws 50, the width of the air gaps 47, 48, and 49 may be adjusted; and by individual adjustment of the screws, the air gaps 47 and 49 may be equalized for a neutral position of the rocker arm 18 such as, for example, zero pressure in pressure bellows 20. When the air gaps are properly adjusted, the armature is fixed in position relative to rocker arm 18 by screwing down on set screws 51 which extend downwardly through threaded openings in rocker arm 18 so that the lower ends of the set screws bear firmly against the top of armature 46. For optimum efficiency the core 34 and the armature 46 are preferably formed of laminations of magnetic material such as soft iron. In order to facilitate mounting, the armature 46 may, as shown, have a composite construction with the lower half formed of laminated magnetic material and the upper half formed of an easily threaded solid material such as a steel bar.

It is believed that the operation of the pressure sensitive apparatus so as to indicate absolute pressure in conduit 27 on instrument 45 will now be clear. When the pressure in conduit 27 is at some reference value, such as zero p.s.i.a., the pressures in vacuum bellows 19 and pressure bellows 20 will be equal and zero and the rocker arm 18 will occupy the horizontal position shown in FIG. 2. For this condition the armature 46 is initially adjusted by means of the screws 50 and 51 so that the air gaps 47, 48, and 49 are equal at a predetermined spacing for the desired output voltage gradient of the transducer. The magnetic flux produced by the primary windings 39 and 40 will then circulate through the armature 46 and the outer legs 36 and 37 of the E-core 34. The net flux threading the center legs 41 will be zero so that the output voltage fed from the secondary winding 41 to the instrument 45 will be zero and the instrument will indicate zero.

As the pressure in fluid conduit 27 and the connected pressure bellows 20 increases, the bellows 20 expands, pushing upwardly on the right-hand end of rocker arm 18. This causes a counterclockwise rotative movement of the rocker arm to a position such as that illustrated in FIG. 4, this movement being permitted by elastic deformation or twisting of the spring portions 14 and 15 about the twist axis of torsion bar 13. The connected armature 46 similarly rotates and in so doing acts to widen air gap 49 and narrow air gap 47. Because of this action, the reluctance of the parallel magnetic circuit paths threading the outer core legs 36 and 37 and the common leg 38 becomes unequal so that a net flux threads center leg 38 causing a voltage to be induced in winding 41 and a corresponding deflection of the indicator of pressure sensitive instrument 45. The greater the pressure in conduit 27 and bellows 20, the greater the tilt of rocker arm 18 and indication of instrument 45, the relationship between the pressure and the instrument indication being approximately linear. It has been found from experiment that the linearity of the instrument may be improved by shifting the E-core of the transducer slightly in the direction of the pressure bellows. In a developmental instrument reading pressures up to 600 p.s.i.a., the optimum results were obtained when the E-core was shifted approximately $\frac{1}{16}$ inch from the central position as seen most clearly in FIG. 4 of the drawing. The gradient of the output signal, or in other words the amount of deflection of instrument 45 per degree of rotation of the rocker arm 18 may be conveniently changed by adjustment of the screws 51 to change the spacing of air gaps 47, 48, and 49.

In the developmental instrument referred to above, the torsion bar 13 had a diameter of 0.110 inch and a length of the spring sections 14 and 15 of 0.250 inch. The torsion bar was constructed of a nickel-chromium alloy sold by the International Nickel Company under the trade name "Inconel X" having the following composition: nickel 70 percent, chromium 15 percent, titanium 2.5 percent, columbium 1 percent, aluminum 0.75 percent, iron 7 percent, manganese 0.75 percent and the balance impurities with a maximum carbon content of 0.08 percent. This material was found to operate properly as a spring in ambient temperatures up to 1000° F. and with a design stress of 25,000 p.s.i. The elasticity of this material is such that for a pressure range of approximately 600 p.s.i.a. the rotation of the rocker arm was only about 1 degree. Because of the stiffness of the moving system of the instrument, it is extremely rugged and resistant to vibration. Also, because of the symmetry of the apparatus with respect to perpendicular planes passing through section line 2—2 of FIG. 1 and 3—3 of FIG. 2 and the further fact that the longitudinal axis of the rocker arm 18 lies in a plane containing the twist axis of torsion bar 13, the apparatus is relatively insensitive to acceleration forces because the torques they produce balance out and hence do not cause spurious readings of the instrument under extreme conditions of vibration and shock encountered, for example, on aircraft engine installations.

It is to be noted, also, that because of the torsion bar suspension which acts as both a support and a pivot, one of the principal sources of hysteresis error, which is static friction, is eliminated since there is no pivot friction or sliding electrical contacts. This contributes substantially to the accuracy and reliability of the instrument.

While pressure sensitive apparatus has been illustrated for measurement of absolute pressure, the apparatus may also be used to measure the difference in two pressures. For such use the plug 23 would be removed and a second pressure conduit would be connected to bellows 19 in a manner similar to the way conduit 27 is coupled to bellows 20. The apparatus would then measure the difference in the pressures existing in the two conduits. Also, for measurement of gauge pressure, as distinguished from absolute pressure, it is only necessary to remove plug 29 so as to expose the interior of bellows 19 to ambient pressure.

It is to be noted, also, that in the illustrated arrangement expansible units in the form of flexible bellows have been shown. Obviously, other expansible devices such as those utilizing expansible diaphragms may be used without departing from the invention.

While there are shown and described particular embodiments of the invention, it will occur to those skilled in the art that various changes and modifications may be made without departing from the invention; and it is therefore intended to cover in the appended claims all such changes and modifications as fall within the true spirit and scope of the invention.

What I claim as new and desire to secure by Letters Patent of the United States is:

1. Pressure sensitive apparatus comprising a rigid rocker arm having a longitudinal axis, an elastically deformable torsion bar having an intermediate portion rigidly connected to and supporting said arm between the ends thereof, said bar extending from both sides of said rocker arm along a twist axis extending perpendicular to the longitudinal axis of said rocker arm and lying in a plane containing said longitudinal axis, a base member, a pair of vertical wall members rigidly affixed to said base member and positioned on opposite sides of said rocker arm, the outer extremities of said torsion bar being rigidly connected to and supported by said wall members, a pair of expansible devices mounted on said base member with the outer ends thereof connected to said rocker arm on opposite sides of said twist axis so that fluid pressure in one of said expansible devices tends to twist said torsion bar in one direction about said twist axis and fluid pressure in the other of said expansible devices tends to twist said torsion bar in the opposite direction about said twist axis, means including fluid conduit means connected to at least one of said expansible devices for differentially varying the pressure in said expansible devices to cause rotation of said rocker arm about said twist axis, said rotation being permitted entirely by elastic deformation of said torsion bar, and signal means responsive to the degree of rotation of said rocker arm for producing a signal indicative of the differential of the fluid pressures in said expansible devices.

2. Pressure sensitive apparatus as set forth in claim 1 wherein the signal means includes a differential transformer comprising an E-core provided with primary and secondary windings, the core being mounted on the base member, a cooperating armature member connected to rotate with the rocker arm, and an indicating instrument energized in accordance with the voltage induced in said secondary winding.

3. Pressure sensitive apparatus as set forth in claim 1 wherein the signal means includes a differential transformer comprising a relatively stationary E-core having a primary winding adapted to be connected to a source of alternating current and a secondary winding adapted to energize a pressure signal indicator, a relatively movable juxtaposed armature member arranged to form variable air gaps between the armature member and the ends of the legs of the E-core, and connecting means mounting said armature member on the rocker arm to rotate therewith and thereby differentially vary said air gaps and the voltage induced in said secondary winding, said connecting means having adjusting means initially to adjust the position of said armature member relative to said rocker arm to vary the gradient of the output signal voltage induced in said secondary winding.

4. Pressure sensitive apparatus comprising a base member, a pair of spaced, vertical wall members rigidly affixed to said base member and positioned on opposite sides thereof, a torsion bar extending along a twist axis thereof and having end portions rigidly connected to said wall members, a rocker arm having a longitudinal axis extending between end portions thereof and an intermediate portion rigidly connected to and supported by said torsion bar so that the longitudinal axis of the rocker arm and the twist axis of the torsion bar are mutually perpendicular and lie in a common plane, a first flexible bellows mounted on said base member and having its free end connected to said rocker arm adjacent one end thereof on one side of said torsion bar twist axis, a second flexible bellows mounted on said base member and having its free end connected to said rocker arm adjacent the other end thereof on the other side of said torsion bar twist axis, means producing a differential pressure variation in said bellows to cause a twisting of said torsion bar and rotation of said rocker arm against the elastic deformation force exerted on said rocker arm by said torsion bar, and signal means responsive to the degree of rotation of said rocker arm for producing a signal indicative of the differential of the fluid pressure in said flexible bellows.

5. Pressure sensitive apparatus as set forth in claim 4 wherein the signal means is an E-core differential transformer having a movable armature connected to rotate with said rocker arm.

References Cited by the Examiner

UNITED STATES PATENTS

| 2,365,573 | 12/44 | McGay | 73—407 |
|---|---|---|---|
| 2,707,001 | 4/55 | Hathaway. | |
| 2,729,780 | 1/56 | Miller et al. | 73—410 X |
| 2,788,664 | 4/57 | Coulbourn et al. | 73—398 |
| 2,816,444 | 12/57 | Gomez | 73—407 |
| 2,912,863 | 11/59 | Naybor | 73—398 |
| 3,100,858 | 8/63 | Topazio et al. | 73—398 X |
| 3,141,334 | 7/64 | Hastings | 73—410 |

FOREIGN PATENTS 195,229  3/23  Great Britain.

LOUIS R. PRINCE, *Primary Examiner.*

ROBERT L. EVANS, RICHARD QUEISSER,
*Examiners.*